US010565018B2

(12) United States Patent
Baldwin et al.

(10) Patent No.: US 10,565,018 B2
(45) Date of Patent: *Feb. 18, 2020

(54) TIME FRAME BOUNDED EXECUTION OF COMPUTATIONAL ALGORITHMS

(71) Applicant: International Business Machines Corporation, Armonk, NY (US)

(72) Inventors: Duane M. Baldwin, Mantorville, MN (US); Sasikanth Eda, Andhra Pradesh (IN); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,193

(22) Filed: Dec. 6, 2017

(65) Prior Publication Data

US 2018/0095791 A1 Apr. 5, 2018

Related U.S. Application Data

(63) Continuation of application No. 15/270,391, filed on Sep. 20, 2016.

(51) Int. Cl.
G06F 9/50 (2006.01)

(52) U.S. Cl.
CPC .......... *G06F 9/5027* (2013.01); *G06F 9/5005* (2013.01); *G06F 9/505* (2013.01)

(58) Field of Classification Search
CPC ....... G06F 9/5027; G06F 9/5005; G06F 9/505
See application file for complete search history.

(56) References Cited

U.S. PATENT DOCUMENTS

| 2009/0293022 A1 | 11/2009 | Fries |
| 2010/0186020 A1 | 7/2010 | Maddhirala et al. |
| 2013/0179895 A1 | 7/2013 | Calder et al. |

(Continued)

OTHER PUBLICATIONS

Ming Mao, Cloud Auto-Scaling with Deadline and Budget Constraints, 11th ACM/IEEE International Conference on Grid Computing, Oct. 25-28, 2010, 10 pages.

(Continued)

*Primary Examiner* — Jacob D Dascomb
(74) *Attorney, Agent, or Firm* — Robert Bunker; Edell, Shapiro & Finnan, LLC (57) ABSTRACT

A present invention embodiment manages resources of a distributed system to perform computational tasks within a specified time interval. A received object is classified into a type of computational processing, and a quantity of objects is maintained for each type. An execution time for processing a single object is estimated based on a corresponding computation resource template. A total execution time for the quantity of objects of a type of computational processing is determined based on the estimated execution time. In response to the total execution time exceeding a user-specified time interval, an amount of resources of the distributed system is determined to process the quantity of objects of the type within the user-specified time interval. Nodes of the distributed system with objects classified in the type use the determined amount of resources to process the quantity of objects for the type within the user-specified time interval.

6 Claims, 8 Drawing Sheets

(56) References Cited

U.S. PATENT DOCUMENTS

| | | |
|---|---|---|
| 2013/0346615 A1 | 12/2013 | Gondi |
| 2015/0074679 A1 | 3/2015 | Fenoglio et al. |
| 2015/0143363 A1* | 5/2015 | Gombert ............. G06F 9/45533 718/1 |
| 2016/0098292 A1* | 4/2016 | Boutin .................... G06F 9/505 718/104 |
| 2016/0352588 A1* | 12/2016 | Subbarayan ............ H04L 69/16 |
| 2018/0004570 A1* | 1/2018 | Maupu .................. G06F 9/5038 |
| 2018/0081719 A1 | 3/2018 | Baldwin et al. |

OTHER PUBLICATIONS

List of IBM Patents or Patent Applications Treated as Related, Dec. 2017, 1 page.

* cited by examiner

TIME FRAME BOUNDED EXECUTION OF COMPUTATIONAL ALGORITHMS

CROSS-REFERENCE TO RELATED APPLICATIONS

This application is a continuation of U.S. patent application Ser. No. 15/270,391, entitled "TIME FRAME BOUNDED EXECUTION OF COMPUTATIONAL ALGORITHMS" and filed Sep. 20, 2016, the disclosure of which is incorporated herein by reference in its entirety.

BACKGROUND

1. Technical Field

Present invention embodiments relate to object storage systems, and more specifically, to a compute engine of a distributed object storage system supporting execution of computational algorithms within a specified time frame.

2. Discussion of the Related Art

A distributed object storage architecture comprises two entities (or node groups) including proxy nodes and storage nodes. Proxy nodes are used for distributed load handling/request handling into a storage namespace, while storage nodes are responsible for writing to disks/storage subsystems. This architecture serves as a storage unit/repository, where analysis of the data residing in the storage nodes (e.g., extracting meaningful information from raw data) may be accomplished by an additional client or compute node.

An enhancement to this architecture comprises a compute engine present within the storage and/or proxy nodes. An end-user frames a computational algorithm and deploys or passes the computational algorithm to the compute engine as a normal object (Hypertext Transfer Protocol (HTTP)) PUT operation. Since the storage/proxy nodes act as compute nodes and return results to the end-user, this enhanced architecture does not require any additional client or compute node to perform analysis of the data.

In a synchronous mode of operation, the compute engine executes the computational algorithm within a Hypertext Transfer Protocol (HTTP) request/response that initiated the execution. In other words, the HTTP request ends after the computational algorithm completes execution. However, in an asynchronous mode of operation, the HTTP request that initiated execution of the computational algorithm completes as soon as the system registered the request in a queue. The computational algorithm is executed in the background, and results may be accumulated in an output object that further includes information about a completion status. Subsequently, an initiator of the computational algorithm may access the output object and retrieve the results of the computation.

In both the synchronous and asynchronous modes of operation, once the computational algorithm is deployed by the end-user, the compute engine receives the computational algorithm and invokes a container (whose resources are limited by the entitlements of the user) on a best node (any of the proxy or storage nodes, where the best node is selected based on the maximum available resources at that particular point of time). For the synchronous mode of operation, the end-user simply waits (e.g., at a terminal of an end-user device) for the completion of the computational algorithm (HTTP request completion). There is no indication of a wait time for completion of the computational algorithm.

With respect to the asynchronous mode of operation, the end-user continuously checks the output object for completion of the computational algorithm. There is no indication of the length of time to complete the computational algorithm, and the end-user cannot specify a maximum time for the computational algorithm to complete processing. For example, a distributed object storage system may operate with a lesser workload during non-business hours, and the administrator or end-user desires to finish processing of complex algorithms within this time window. However, the end-user does not have control of resources to time bound the computational algorithm.

Another scenario pertains to Quality of Service (QoS). In this case, an end-user may have a high QoS, and all nodes may be used for faster processing of a single computational algorithm. However, this is inefficient since all the nodes or computation resources are used even though the computational algorithm may be completed within a desired time frame (with a lesser quantity of nodes).

SUMMARY

According to one embodiment of the present invention, a system for managing resources of a distributed system including a plurality of nodes to perform computational tasks within a specified time interval includes at least one processor. The system classifies a received object into a type of computational processing among a plurality of types and maintains a quantity of objects classified in each type of computational processing. An execution time for processing a single object for the type of computational processing is estimated based on a corresponding computation resource template. A total execution time for the quantity of objects classified in the type of computational processing is determined based on the estimated execution time. In response to the total execution time exceeding a user-specified time interval, an amount of resources of the distributed system is determined, wherein the amount of resources is required to process the quantity of objects classified in the type of computational processing within the user-specified time interval. Nodes of the distributed system with objects classified in the type of computational processing are invoked to use the determined amount of resources and process the quantity of objects classified in the type of computational processing within the user-specified time interval.

Present invention embodiments employ a time frame bounded execution model that seeks maximum execution time from the end-user for a specified computational processing, and determines and assigns a related amount of resources to be used for completing the computational processing within the user-specified time frame. A scheduler framework improves computation performance in a multi-node object storage environment by implementing proposed workflow changes in an embedded compute engine to enable time frame bounded execution in both synchronous and asynchronous execution modes.

A present invention embodiment may further store an indication of a node corresponding to the type of computational processing for the received object, and adjust the quantity of objects for the type of computational processing based on the classification. This enables determination of current estimates of execution time since objects are continuously classified and corresponding quantities of objects are updated for the types of computational processing.

Further, a present invention embodiment may invoke a container on the nodes of the distributed system with objects classified in the type of computational processing. This reduces an amount of data transfer between the nodes to enhance processing performance.

In addition, an execution time may be estimated by parsing the deployed computational processing into a sequence of actions, identifying operations to perform the sequence of actions, and retrieving information from the corresponding computation resource template for the identified operations. This provides for an estimate of execution time based on the actual operations within the computational processing, thereby providing an estimate of execution time with enhanced accuracy for determining the resources required to perform the computational processing within the user-specified time interval.

Embodiments of the present invention further include a method and computer program product for managing resources of a distributed system including a plurality of nodes to perform computational tasks within a specified time interval in substantially the same manner described above.

BRIEF DESCRIPTION OF THE DRAWINGS

Generally, like reference numerals in the various figures are utilized to designate like components.

DETAILED DESCRIPTION

An embodiment of the present invention classifies a received object into a type of computational processing among a plurality of types and maintains a quantity of objects classified in each type of computational processing. An execution time for processing a single object for the type of computational processing is estimated based on a corresponding computation resource template. A total execution time for the quantity of objects classified in the type of computational processing is determined based on the estimated execution time. In response to the total execution time exceeding a user-specified time interval, an amount of resources of a distributed system is determined, wherein the amount of resources is required to process the quantity of objects classified in the type of computational processing within the user-specified time interval. Nodes of the distributed system with objects classified in the type of computational processing are invoked to use the determined amount of resources and process the quantity of objects classified in the type of computational processing within the user-specified time interval.

Accordingly, present invention embodiments enable a compute engine of a distributed object storage system to execute computational algorithms in time frame bounded execution modes (e.g., synchronous and asynchronous modes). The time frame bounded execution model is employed by present invention embodiments to ascertain a maximum execution time from an end-user for a specified computational task, and determine and assign a related amount of resources to be used for completing the computational task within the user-specified time frame. A scheduler framework improves computation performance in a multi-node object storage environment by implementing proposed workflow changes in an embedded compute engine which enables time frame bounded execution in both synchronous and asynchronous execution modes.

Moreover, present invention embodiments provide a framework (and middleware) that may be integrated with a distributed object storage system architecture for automatic scaling of computation resources (e.g., computation resource expansion/contraction) based on a user deployed computational algorithm (or module containing code or instructions implementing the computational algorithm) and a provided time interval (or time period, window, or frame).

A present invention embodiment may further store an indication of a node corresponding to a type of computational processing for a received object, and adjust the quantity of objects for the type of computational processing based on the classification. This has the advantage of enabling determination of current estimates of execution time since objects are continuously classified and corresponding quantities of objects are updated for the types of computational processing.

A present invention embodiment may further invoke a container on the nodes of the distributed system with objects classified in the type of computational processing. This has the advantage of reducing an amount of data transfer between the nodes to enhance processing performance.

In addition, a present invention embodiment may further estimate an execution time by parsing the deployed computational processing into a sequence of actions, identifying operations to perform the sequence of actions, and retrieving information from the corresponding computation resource template for the identified operations. This has the advantage of providing an estimate of execution time based on the actual operations within the computational processing, thereby providing an estimate of execution time with enhanced accuracy for determining the resources required to perform the computational processing within the user-specified time interval.

Figure 1:
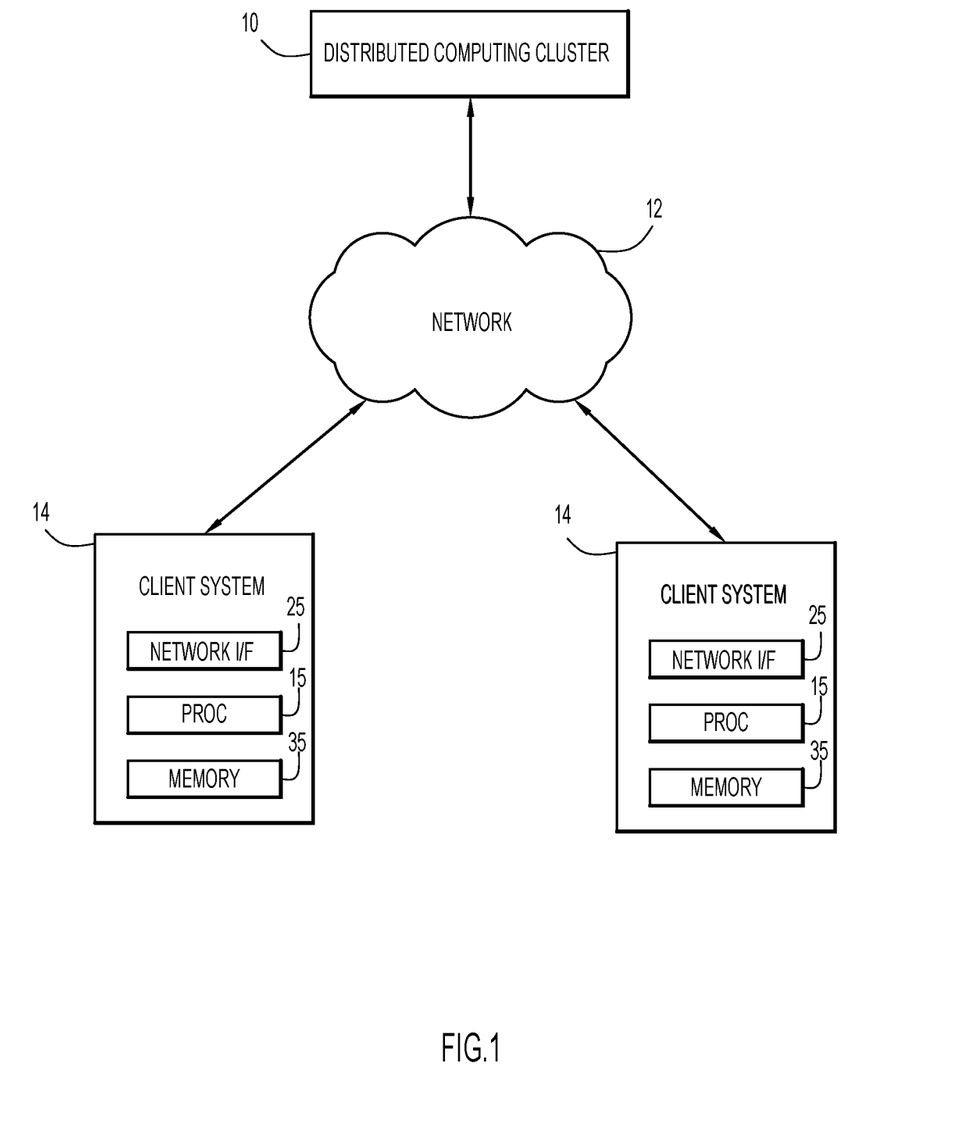
FIG. 1 is a diagrammatic illustration of a computing environment for use with an embodiment of the present invention.

An example computing environment for use with present invention embodiments is illustrated in FIG. 1. Specifically, the computing environment includes a distributed computing cluster 10 implementing a distributed object storage system, and one or more client or end-user systems 14. Distributed computing cluster 10 and client systems 14 may be remote from each other and communicate over a network 12. The network may be implemented by any number of any suitable communications media (e.g., wide area network (WAN), local area network (LAN), Internet, Intranet, etc.). Alternatively, distributed computing cluster 10 and client systems 14 may be local to each other, and communicate via any appropriate local communication medium (e.g., local area network (LAN), hardwire, wireless link, Intranet, etc.).

Client systems 14 enable users to submit processing requests to distributed computing cluster 10 to determine various information (e.g., analytics, data retrieval, etc.). The client systems may present a graphical user (e.g., GUI, etc.) or other interface (e.g., command line prompts, menu screens, etc.) to solicit information from users pertaining to the desired processing requests, data, and/or analysis, and may provide reports including results of the processing requests (e.g., analytics, etc.).

Client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., browser/interface software, one or more applications providing requests for the distributed computing cluster, etc.).

Figure 2:
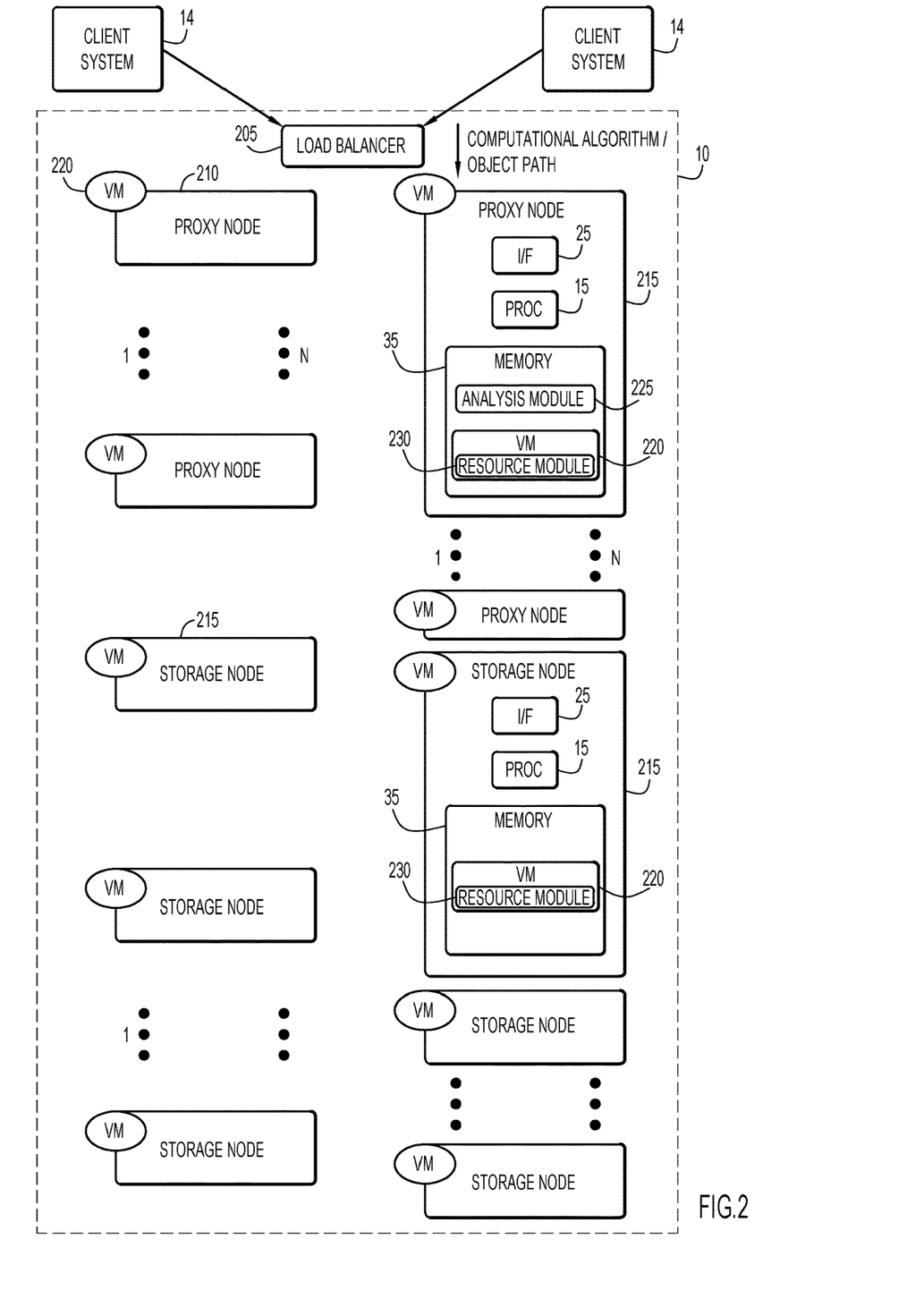
FIG. 2 is a diagrammatic illustration of an example distributed computing cluster of the computing environment of FIG. 1.

Referring to FIG. 2, distributed computing cluster 10 includes a load balancer node 205, one or more proxy nodes 210, and one or more storage nodes 215. Load balancer node 205, proxy nodes 210, and storage nodes 215 implement the distributed object storage system and perform data storage and computing operations to process requests from client systems 14. Load balancer node 205, proxy nodes 210, and storage nodes 215 may be remote from each other and communicate over a network (not shown). The network may be implemented by any number of any suitable communications media (e.g., wide area network (WAN), local area network (LAN), Internet, Intranet, etc.), and may be the same or different network than network 12 (FIG. 1). Alternatively, load balancer node 205, proxy nodes 210, and storage nodes 215 may be local to each other, and communicate via any appropriate local communication medium (e.g., local area network (LAN), hardwire, wireless link, Intranet, etc.).

The load balancer node receives requests from client systems 14, and distributes the requests to proxy nodes 210 for processing based on available resources of the proxy nodes. In other words, the load balancer node manages the workloads of the proxy nodes for processing the requests. The proxy nodes are used for distributed load handling/request handling into a namespace of the distributed object storage system, while storage nodes are responsible for writing to disks/storage sub-systems of the distributed object storage system.

The proxy and/or storage nodes include a virtual machine 220 (e.g., LINUX containers, DOCKERS containers, ZEROVM, etc.) to provide a compute engine in order to perform computational tasks on the data within the distributed object storage system. The compute engine may utilize a corresponding container providing a suitable execution environment. An end-user frames a computational algorithm, and deploys or passes the computational algorithm (or module containing code or instructions implementing the computational algorithm) to the compute engine as a normal object (Hypertext Transfer Protocol (HTTP)) PUT operation.

In a synchronous mode of operation, the compute engine executes the computational algorithm within a Hypertext Transfer Protocol (HTTP) request/response that initiated the execution. In other words, the HTTP request completes after the computational algorithm completes execution. An example HTTP PUT method to deploy a computational algorithm (e.g., image_processing.storlet) in a synchronous mode of operation (e.g., "Mode:sync") to a compute engine (or virtual machine 220) may be of the following form (e.g., issued below via a cURL command (e.g., a command-line tool for transferring data via various protocols), but any types of deployment may be utilized):

curl-X PUT image_processing.storlet-H "X-Mode:sync"-H "X-Auth:AUTH_123"http://0.0.0.0/v1/

However, in an asynchronous mode of operation, the HTTP request that initiated execution of the computational algorithm completes as soon as the system registered the request in a queue. The computational algorithm is executed in the background, and results may be accumulated in an output object that further includes information about a completion status. Subsequently, an initiator of the computational algorithm may access the output object and retrieve the results of the computation. Example HTTP PUT and GET methods to deploy a computational algorithm (e.g., image_processing.storlet) in an asynchronous mode of operation (e.g., "Mode:sync") to a compute engine (or virtual machine 220) and retrieve a corresponding output object (e.g., indicated by the system in response to the PUT method) may be of the following forms (e.g., issued below via a cURL command (e.g., a command-line tool for transferring data via various protocols), but any types of deployment may be utilized):

curl -X PUT image_processing.storlet-H "X-Mode:async"-H "X-Auth:AUTH_123"http://0.0.0.0/v1/
[System indicates storlet_1407 object for status]
curl -X GET storlet_1407 -H "X-Auth:AUTH_123"http://0.0.0.0/v1/

In both the synchronous and asynchronous modes of operation, once the computational algorithm is deployed by the end-user, the virtual machine receives the computational algorithm and invokes a container for the compute engine (the container resources are limited by the entitlements of the user) on a best node (any of the proxy or storage nodes, where the best node is selected based on the maximum available resources at that particular point of time). For the synchronous mode of operation, the end-user simply waits (e.g., at a terminal of an end-user device) for the completion of the computational algorithm (HTTP request completion). There is no indication of a wait time for completion of the computational algorithm.

With respect to the asynchronous mode of operation, the end-user continuously checks the output object for completion of the computational algorithm. There is no indication of the length of time to complete the computational algorithm, and the end-user cannot specify a maximum time for the computational algorithm to complete processing.

Present invention embodiments enable the compute engine of the distributed object storage system to execute computational algorithms in time frame bounded execution modes (e.g., synchronous and asynchronous modes). The time frame bounded execution model is employed by present invention embodiments to ascertain a maximum execution time from an end-user for a specified computational task, and determine and assign a related amount of resources to be used for completing the computational task within the user-specified time frame.

In particular, one or more proxy nodes 210 include an analysis module 225 to analyze and classify an object (e.g., data or other object) of the distributed object storage system into a computational algorithm category, and estimate an execution time for the computational algorithm based on the category and quantity of objects within the category according to an embodiment of the present invention as described below. One or more virtual machines 220 (providing compute engines) include a resource module 230 to compare the estimated execution time to a user-specified time interval. If the estimated execution time exceeds the user-specified time interval, computation resources for virtual machines 220 (including the compute engines and/or containers) are adjusted and assigned to enable the computational algorithm to be executed within the specified time interval according to an embodiment of the present invention as described below.

Load balancer node 205, proxy nodes 210, and storage nodes 215 may be implemented by any conventional or other computer systems (e.g., server computer systems, etc.), preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, analysis modules, resource modules, virtual machines, containers, compute engines, etc.).

The modules (e.g., analysis modules, resource modules, virtual machines, containers, compute engines, etc.) may include one or more modules or units to perform the various functions of present invention embodiments described below. The various modules (e.g., analysis modules, resource modules, virtual machines, containers, compute engines, etc.) may be implemented by any combination of any quantity of software and/or hardware modules or units, and may reside within memory 35 of the proxy and/or storage nodes for execution by a corresponding processor 15.

Figure 3:
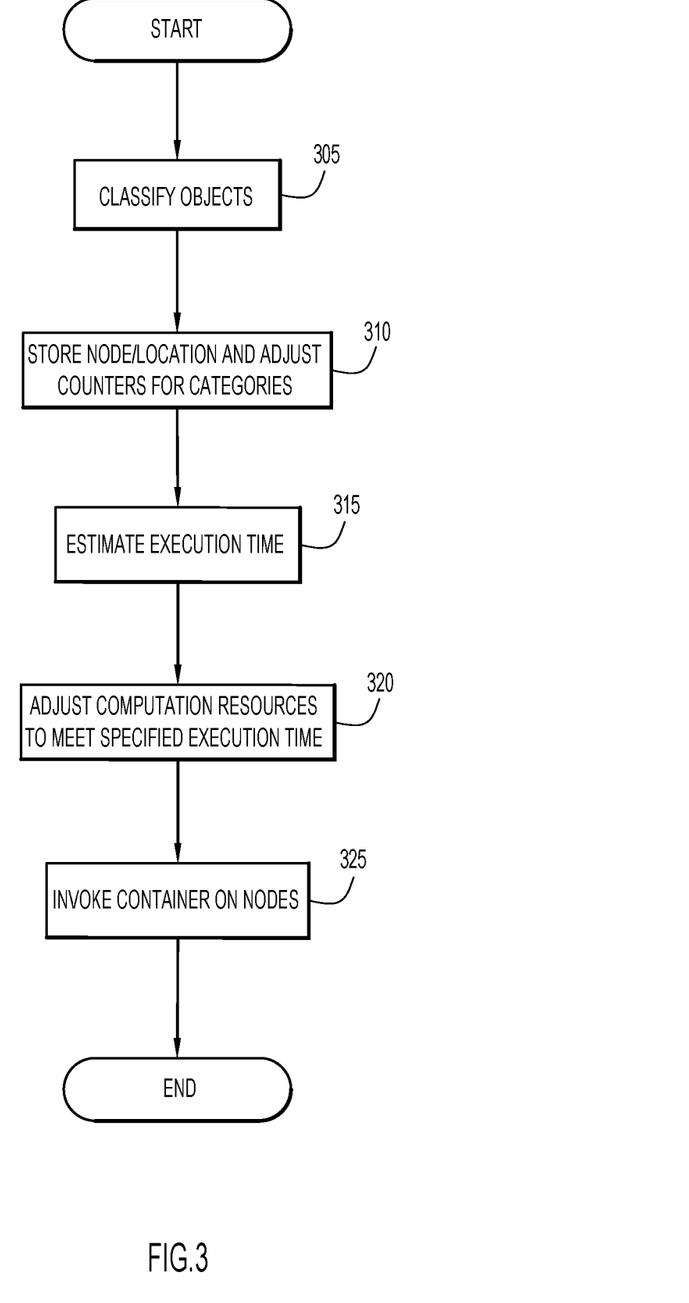
FIG. 3 is a procedural flow chart of a manner of executing a computational algorithm within a specified time interval according to an embodiment of the present invention.

A manner of time bounding a computational algorithm (e.g., via distributed computing cluster 10, analysis module 225 and resource module 230) according to an embodiment of the present invention is illustrated in FIG. 3. Initially, analysis module 225 classifies objects (e.g., data or other objects) of the distributed object storage system at step 305 according to requirements of pre-configured computational algorithm types or categories. The types may be pre-configured and/or entered when a computational algorithm is provided to the distributed object storage system. The objects may be classified at various instances. For example, the existing objects in the distributed object storage system may be classified when one or more computational algorithms (or types) are entered into the distributed object storage system (e.g., in case the new type may alter existing classifications for objects, etc.). Further, an object may be classified upon entry of the object into the distributed object storage system. The distributed object storage system may enable automatic classification of an object (e.g., based on content, owner, etc.) as described below (e.g. for FIG. 4). Alternatively, an object may be manually classified based on classification input, preferably from a user.

By way of example, the distributed object storage system may employ the below example computational algorithm types (e.g., the computational algorithm types may be preprogrammed to a storage node, whereas the dataset needed for these computational algorithms vary):

```
computation_algorithm1 = {'create TAR of customer related
  forms'};
computation_algorithm2 = {'create EXCEL of salary paid during
  Q1'}; and
computation_algorithm3 = {'create PDF containing addresses of
  partners in south Asia'}.
```

A classification is determined for an object based on which computational algorithm (or type) would potentially need that object in the future.

Once the classification is determined for an object, analysis module 225 stores information for the object at storage locations based on the determined classification for the object. The analysis module further adjusts (e.g., increments, decrements, etc.) a corresponding object counter representing a quantity of objects classified within the corresponding computational algorithm type. The information for the object includes the appropriate storage node/location (e.g., path for a storage node 215, etc.) containing the object.

For example, a path for a customer_details object (e.g., /storage/path1) classified into a type of computational_algorithm1 is stored at a location used for classifications into the computational_algorithm1 type. The corresponding counter for the type is adjusted (e.g., to a value of 50) to account for the classification. This may be expressed as follows:

```
customer_details (computation_algorithm1): /storage/path1;
  counter_value: 50.
```

A path for an employee_details object (e.g., /storage/path2) classified into a type of computational_algorithm2 is stored at a location used for classifications into the computational_algorithm2 type. The corresponding counter for the type is adjusted (e.g., to a value of 600) to account for the classification. This may be expressed as follows:

```
employee_details (computation_algorithm2): /storage/path2;
  counter_value: 600.
```

A path for a partner_details object (e.g., /storage/path3) classified into a type of computational_algorithm3 is stored at a location used for classifications into the computational_algorithm3 type. The corresponding counter for the type is adjusted (e.g., to a value of 9) to account for the classification. This may be expressed as follows:

```
partner_details (computation_algorithm3): /storage/path3;
  counter_value: 9.
```

A misc_details object may not have a classification, and a path for this object (e.g., /storage/path5) may be stored in a location for similar objects without a classification (or outlier objects).

The corresponding counter for the outlier objects is adjusted (e.g., to a value of 2000) to account for the classification. This may be expressed as follows:

```
misc_details: /storage/path5;
counter_value: 2000.
```

The execution time for the computational algorithm type of each deployed computational algorithm is determined by analysis module 225 at step 315. This may be accomplished by determining the execution time required for processing a single object of a computational algorithm type of a deployed computational algorithm using a computation resource template as described below (e.g., for FIG. 5). The total amount of execution time required for processing the total quantity of objects within the computational algorithm type is determined based on the execution time of the single object.

The computation resources are selectively adjusted for each deployed computational algorithm by resource module 230 to enable the deployed computational algorithm to complete execution within a user-specified time interval for the corresponding computational algorithm. In particular, if the estimated execution time for a computational algorithm type of a deployed computational algorithm is greater than a user-specified maximum execution time (or time interval) for the deployed computational algorithm, resource module 230 calculates or automatically scales computation resources at step 320 to enable the deployed computational algorithm to complete execution within the user-specified time interval.

Containers (e.g., utilized by the compute engines) on nodes are invoked by resource module 230 to execute the deployed computational algorithms with the calculated computation resources at step 325. In particular, containers of nodes which contain objects classified into a computational algorithm type of a deployed computational algorithm are invoked by the resource module. This enables the deployed computational algorithm to be executed with the calculated computation resources, thereby enabling execution of the deployed computational algorithm within the user-specified time interval. The deployed computational algorithms may be executed within the containers (e.g., utilized by the compute engines) in synchronous or asynchronous modes of operation as described above, where results are produced (e.g., at the end-user device for synchronous mode, or within the output object for asynchronous mode) within the user-specified time interval.

Figure 4:
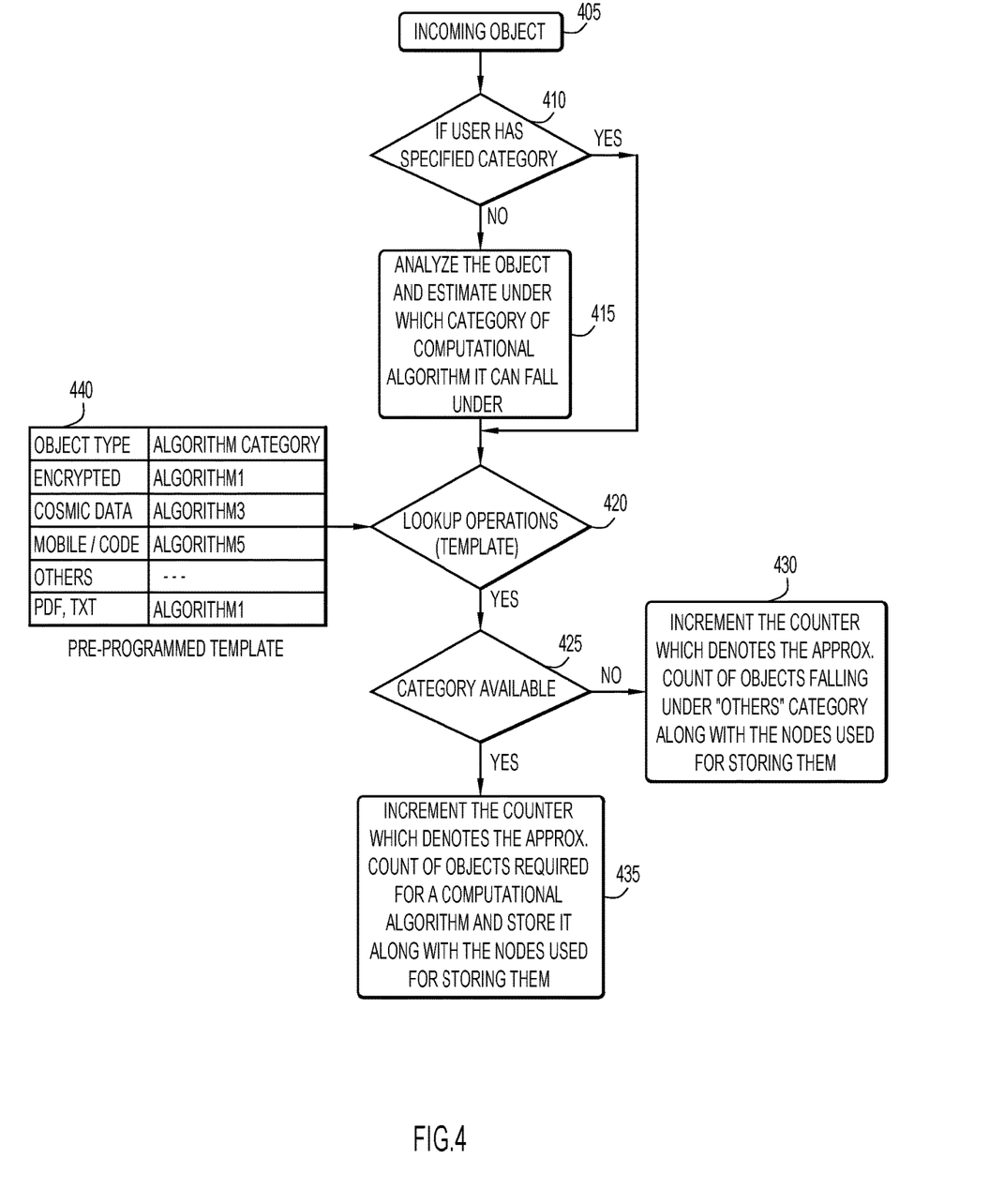
FIG. 4 is a procedural flow chart illustrating a manner of classifying objects according to an embodiment of the present invention.

A manner of classifying an object of the distributed object storage system (e.g., via distributed computing cluster 10 and analysis module 225) according to an embodiment of the present invention (e.g., corresponding to step 305 of FIG. 3) is illustrated in FIG. 4. Initially, an object is received for classification at step 405. If a user has not specified a computational algorithm type (or category) for the object as determined at step 410, the object is analyzed to estimate a corresponding computational algorithm category at step 415. This may be accomplished by determining a type of the object based on various criteria (e.g., content, format, file name extension, metadata, owner privileges, etc.).

Once the object type is determined, the determined object type is applied to a category template 440 of pre-defined computational algorithm categories to determine the classification (or computational algorithm category) for the object at step 420. By way of example, the category template may be in the form of a table and include information (or columns) pertaining to an object type (e.g., with rows corresponding to Encrypted, Cosmic data, Mobile/Code, Others, PDF/TXT as viewed in FIG. 4) and a corresponding computational algorithm category (e.g., with rows corresponding to Algorithm1, Algorithm3, and Algorithm5 as viewed in FIG. 4). However, the category template may include any data structure with any information, and any object types may be associated with any computational algorithms based on a desired application. If the object type does not match any of the object types indicated in category template 440, the object is classified in the outlier category (e.g., Others as viewed in FIG. 4).

If the computational algorithm category is provided from the user as determined at step 410, the specified computational algorithm category is compared to category template 440 at step 420. If the specified computational algorithm category does not match any of the computational algorithm categories indicated in category template 440, the object is classified in the outlier category (e.g., Others as viewed in FIG. 4).

When the determined computational algorithm category is not available within category template 440 (or is considered to be the outlier category (e.g., Others as viewed in FIG. 4)) as determined at step 425, a counter associated with the outlier category is updated or adjusted to indicate the addition of another object to that category at step 430. In addition, the updated counter and information pertaining to nodes used for storing the objects of the outlier category are stored as described above.

If the determined computational algorithm category exists in category template 440 as determined at step 425, a counter associated with the determined computational algorithm category is updated or adjusted to indicate the addition of another object to that category at step 435. In addition, the updated counter and information pertaining to nodes used for storing the objects of the determined computational algorithm category are stored as described above.

Figure 5:
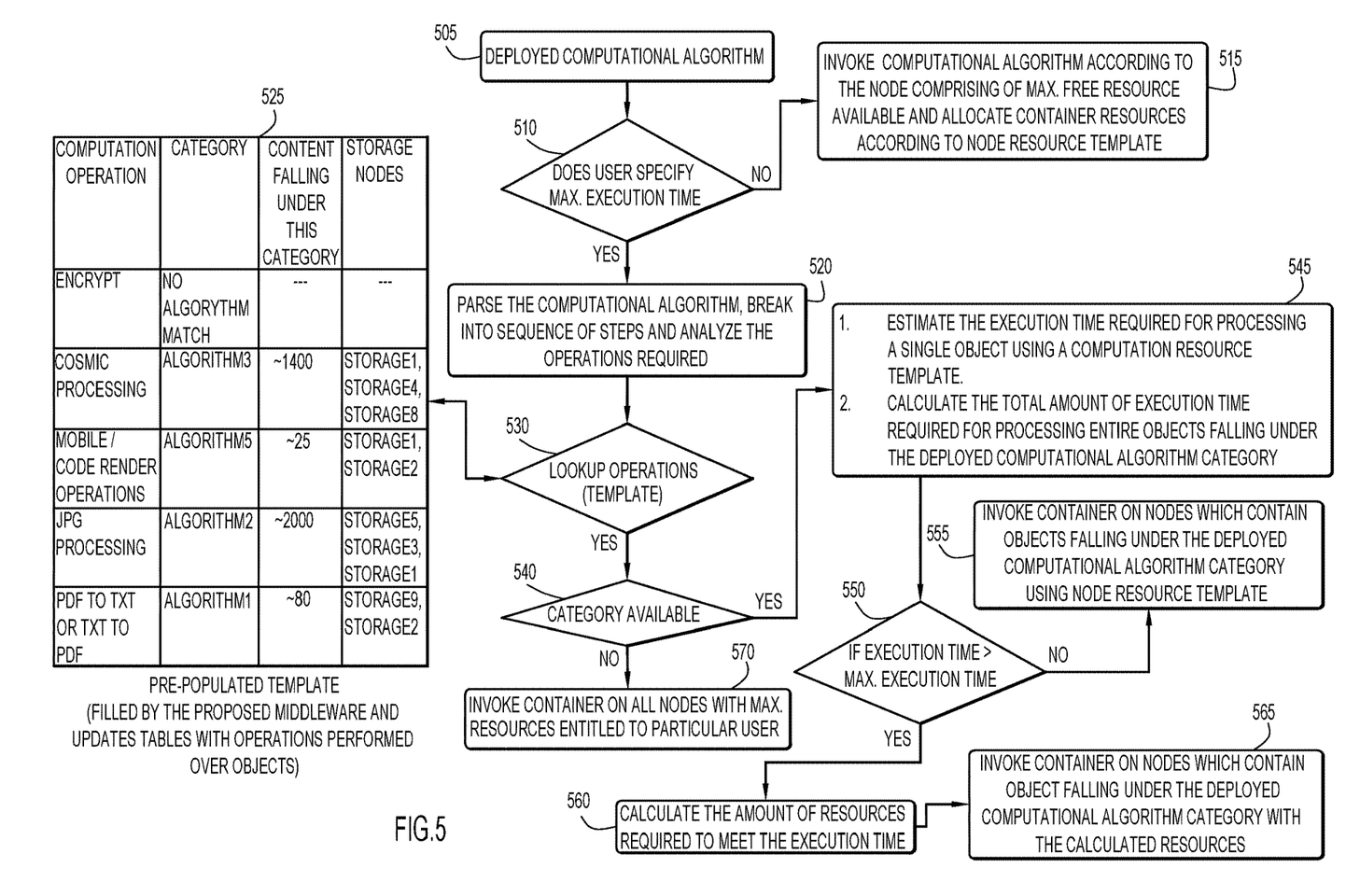
FIG. 5 is a procedural flow chart of a manner of adjusting computation resources according to an embodiment of the present invention.

A manner of adjusting computation resources (e.g., via distributed computing cluster 10 and analysis module 225 and resource module 230) to complete execution of a deployed computational algorithm within a user-specified time interval according to an embodiment of the present invention (e.g., corresponding to steps 315, 320, and 325 of FIG. 3) is illustrated in FIG. 5. In particular, information for a deployed computational algorithm is received by analysis module 225 at step 505. The computational algorithm (or module containing code or instructions implementing the computational algorithm) may be deployed in any desired manner (e.g., commands as described above, etc.). If a user-specified maximum execution time (or time interval) is not provided for the deployed computational algorithm as determined at step 510, the deployed computational algorithm (or container) is invoked by resource module 230 at step 515 on a node (e.g., proxy or storage node) based on a maximum amount of available node resources (e.g., the node with a greatest amount of available resources). Container resources are allocated to the node based on a node resource template. This template may include any desired information (e.g., available node resources (e.g., memory, CPU utilization, etc.), node configurations, etc.), where the nodes may be monitored to update the information to reflect a current status. Storage paths of objects which are configured in a striping mode may be selected for processing, where storage blocks of the objects are striped across all nodes.

When a user-specified maximum execution time (or time interval) is provided for the deployed computational algorithm as determined at step 510, the deployed computational algorithm (e.g., source or other code expressing the computational algorithm, etc.) is parsed by analysis module 225 into a sequence of steps, and corresponding operations are analyzed at step 520. The operations are compared to an operation resource template 525 to identify a corresponding computational algorithm type (or category) for the deployed computational algorithm based on the operations at step 530. By way of example, operation resource template 525 may be in the form of a table and include (columns for) computation operations (e.g., Encrypt, Mobile/Code render operations, JPG processing, and PDF to TXT or TXT to PDF operations as viewed in FIG. 5), a corresponding computational algorithm category (e.g., Algorithm1, Algorithm2, Algorithm3, Algorithm5, an outlier (or Others) category (e.g., for Encrypt) as viewed in FIG. 5), amount of content classified into the computational algorithm category, and storage nodes containing objects classified into the computational algorithm category. However, the operation template may include any data structure containing any desired information, and the computational algorithm categories and operations may be associated in any manner.

When the determined category for the deployed computational algorithm is available in operation template 525 as determined at step 540, an execution time required for processing a single object of the determined category is estimated by analysis module 225 at step 545 using a computation resource template. The computation resource template may provide information relating to execution times of various operations (e.g., execution times (e.g., clocks, elapsed time, etc.) for specific individual or combinations of computer operations, algorithm portions or entire algorithms, etc.). The information may be obtained in various manners (e.g., from manufacturer specifications, measurements of operation of the node, statistical techniques, etc.), and provided for varying configurations of the node (e.g., based on memory, CPU, other node resources, etc.).

For example, the deployed computational algorithm may be parsed into operations, where the execution time for each operation (or combination of operations) may be obtained from the computation resource template. The execution times obtained from the computation resource template may be aggregated to produce an estimated execution time for a single object processed by the deployed computational algorithm. Alternatively, the algorithm of the deployed computational algorithm may be ascertained, and the execution time of the algorithm may be obtained from the computation resource template.

The total amount of execution time required for processing the total objects classified into the determined category of the deployed computational algorithm is calculated based on the execution time of the single object (e.g., the total amount of execution time may be determined by multiplying the quantity of classified objects by the execution time of a single object for the determined category). For example, if the deployed computational algorithm is of the Algorithm 1 type with 60 classified objects, and the estimated execution time for a single object is one second, the total amount of execution time is determined to be one minute (e.g., quantity of classified objects (60)×estimated execution time of a single object (one second)=60 seconds (or one minute)).

If the total amount of execution time for the determined category satisfies the provided time interval for the deployed computational algorithm as determined at step 550, the container (e.g., utilized by the compute engine) on nodes containing objects within the determined category are invoked by resource module 230 to execute the deployed computational algorithm at step 555. Container resources are allocated to the nodes based on the node resource template indicating available node resources.

When the total amount of execution time for the determined category exceeds the provided time interval for the deployed computational algorithm as determined at step 550, the amount of resources required to comply with the provided time interval is determined by resource module 230 at step 560. This may be accomplished by determining proportions of the node configurations based on the estimated total amount of execution time. For example, a total amount of execution time for a deployed computational algorithm may be determined to be one minute (or 60 seconds) on a node configured with 2 GB of RAM based on the computation resource template (e.g., including execution times and node configurations). In order to comply with a user-specified time interval of 30 seconds (e.g., half of the estimated 60 seconds), the amount of resources for the node may be doubled to 4 GB of RAM. Similar resource determinations may be made with respect to other aspects of node configuration (e.g., quantity of CPU cores, CPU processing speed, type and/or speed of cache, etc.).

The container (e.g., utilized by the compute engine) on nodes containing objects within the determined category are invoked by resource module 230 at step 565 with the determined amount of resources to execute the deployed computational algorithm. This may be accomplished by the resource module reconfiguring the virtual machine (and/or containers) of a node with the determined amount of resources. In the event, a node cannot accommodate the determined amount of resources, another node may be identified with sufficient resources and configured with the determined amount of resources to execute the deployed computational algorithm. In this case, the corresponding classified objects within the initial node (with insufficient resources) are provided to the other node. The deployed computational algorithm may be executed in synchronous or asynchronous modes of operation as described above, where results are produced (e.g., at the end-user device for synchronous mode, or within the output object for asynchronous mode) within the user-specified time interval.

Figure 6:
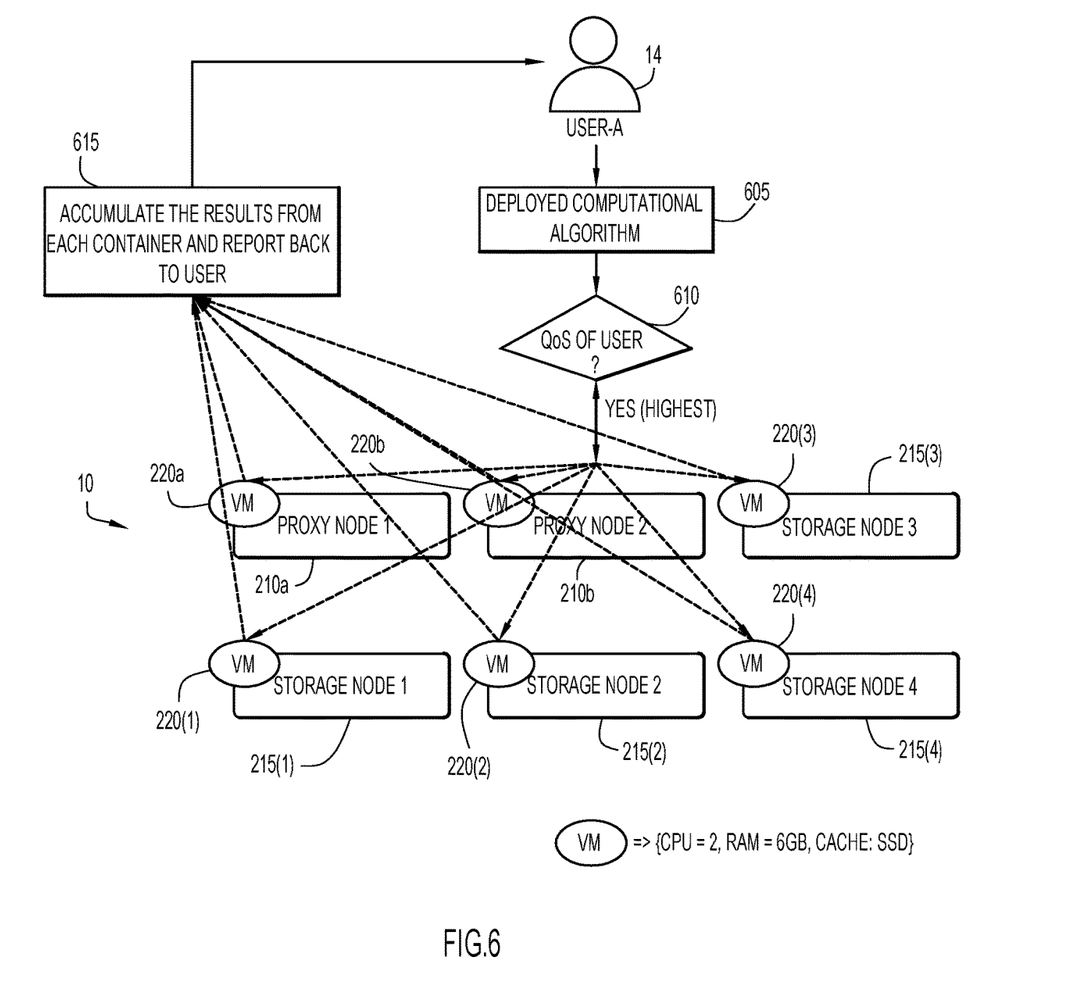
FIG. 6 is a flow diagram of assigning computation resources to complete execution of a computational algorithm for an example scenario.

An example scenario for executing a deployed computational algorithm is illustrated in FIG. 6. A user from a client system 14 deploys a computational algorithm (or module containing code or instructions implementing the computational algorithm) at flow 605. The user is determined to receive a highest Quality of Service (QoS) at flow 610. By way of example, distributed computing cluster 10 includes proxy nodes 210*a* and 210*b* with corresponding virtual machines 220*a* and 220*b*, and storage nodes 215(1), 215(2), 215(3), and 215(4) with corresponding virtual machines 220(1), 220(2), 220(3), and 220(4). The virtual machines are configured, by way of example, with two CPU cores, 6 GB of RAM, and a Solid-State Drive (SSD) cache. In this case, the distributed computing cluster does not utilize the techniques of present invention embodiments, and proceeds to use all nodes for faster processing of the deployed computational algorithm. The results from an invoked container (in which the deployed computational algorithm executes) on each node is accumulated and reported back to the user at flow 615. However, this is inefficient since all the nodes (and computation resources) are used, even though the deployed computational algorithm may be completed within a user-specified time interval with less than all of the resources.

Figure 7:
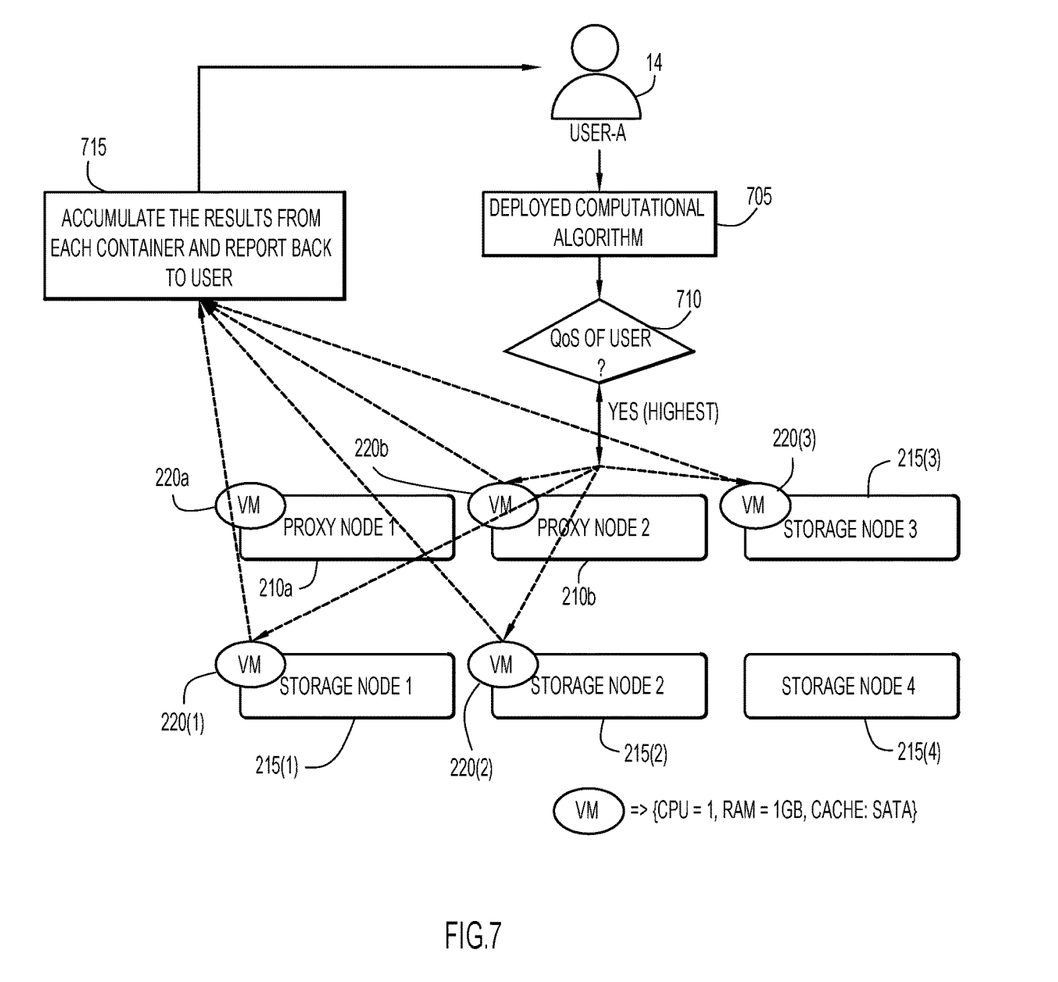
FIG. 7 is a flow diagram of adjusting computation resources to complete execution of a computational algorithm within a specified time interval for an example scenario according to an embodiment of the present invention.

Another example scenario employing techniques of present invention embodiments is illustrated in FIG. 7. A user from a client system 14 deploys a computational algorithm (or module containing code or instructions implementing the computational algorithm) at flow 705, and specifies a maximum time of execution or time interval of forty minutes. The user is determined to receive a highest Quality of Service (QoS) at flow 710. By way of example, distributed computing cluster 10 includes proxy nodes 210*a* and 210*b* and storage nodes 215(1), 215(2), 215(3), and 215(4). By way of further example, proxy nodes 210*a* and 210*b*, and storage nodes 220(1), 220(2), and 220(3) contain classified objects corresponding to the deployed computational algorithm. The analysis described above is performed to determine the resources required to execute the deployed computational algorithm within the user-specified time interval. These resources include, by way of example, a single core CPU, 1 GB of RAM, and a Serial Advanced Technology Attachment (SATA) cache (e.g., a hard-drive based cache).

Accordingly, the virtual machines (and/or containers) of nodes containing the corresponding classified objects (e.g., virtual machines 220*a* of proxy node 210*a*, virtual machine 220*b* of proxy node 220*b*, virtual machine 220(1) of storage node 215(1), virtual machine 220(2) of storage node 215(2), and virtual machine 220(3) of storage node 215(3)) are configured with these resources to execute the deployed computational algorithm within the user-specified time interval. The results from a container (in which the deployed computational algorithm executes) on each of these nodes are accumulated and reported back to the user at flow 715. In this case, only a portion of the distributed computing cluster (and with the virtual machines (and/or containers) including lesser computational resources relative to FIG. 6) is utilized to execute the deployed computational algorithm within the user-specified time interval, thereby leaving remaining resources (on those and the other nodes) available for other tasks and enhancing overall processing performance.

Figure 8:
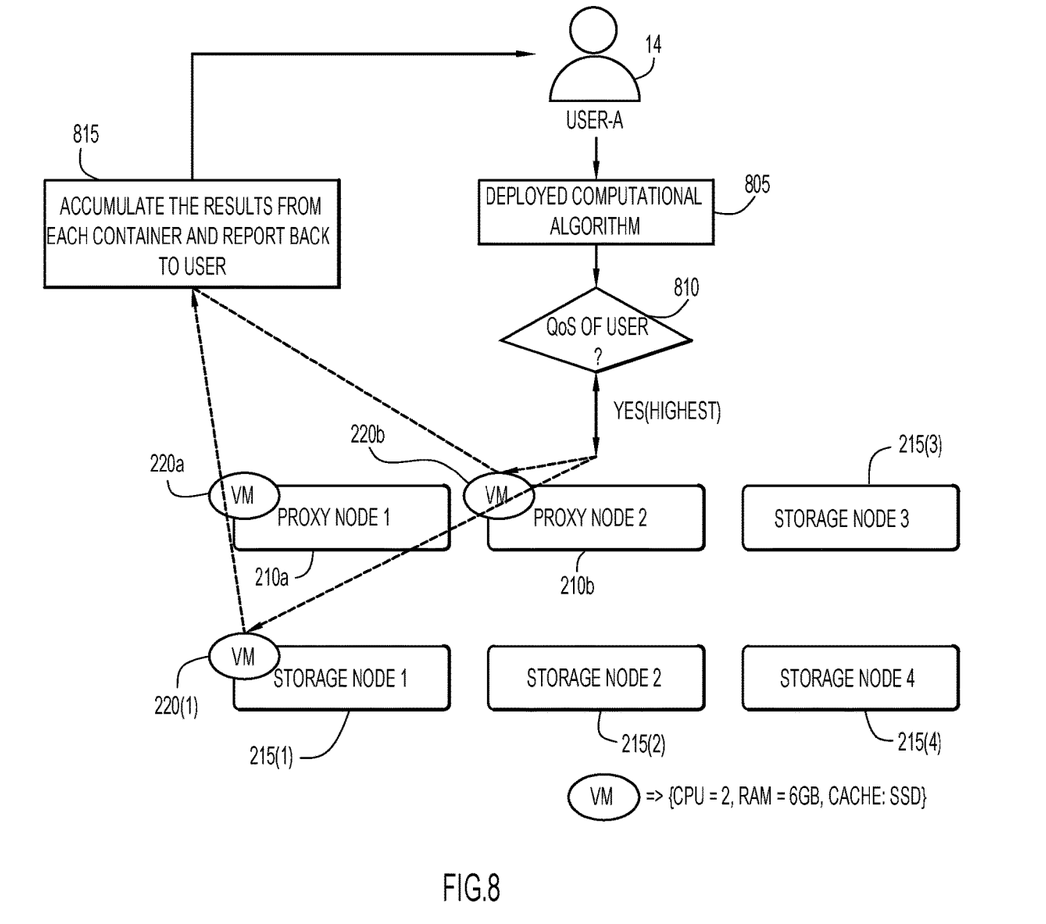
FIG. 8 is a flow diagram of adjusting computation resources to complete execution of a computational algorithm within a specified time interval for another example scenario according to an embodiment of the present invention.

A further example scenario employing techniques of present invention embodiments is illustrated in FIG. 8. A user from a client system 14 deploys a computational algorithm (or module containing code or instructions implementing the computational algorithm) at flow 805, and specifies a maximum time of execution or time interval of five minutes. The user is determined to receive a highest Quality of Service (QoS) at flow 810. By way of example, distributed computing cluster 10 includes proxy nodes 210*a* and 210*b* and storage nodes 215(1), 215(2), 215(3), and 215(4). By way of further example, proxy nodes 210*a* and 210*b*, and storage node 220(1) contain classified objects corresponding to the deployed computational algorithm. The analysis described above is performed to determine the resources required to execute the deployed computational algorithm within the user-specified time interval. These resources include, by way of example, a two core CPU, 6 GB of RAM, and a Solid-State Drive (SSD) cache.

Accordingly, the virtual machines (and/or containers) of nodes containing the corresponding classified objects (e.g., virtual machines 220*a* of proxy node 210*a*, virtual machine 220*b* of proxy node 220*b*, and virtual machine 220(1) of storage node 215(1)) are configured with these resources to execute the deployed computational algorithm within the user-specified time interval. The results from a container (in which the deployed computational algorithm executes) on each of these nodes are accumulated and reported back to the user at flow 815. In this case, only a portion of the distributed computing cluster is utilized to execute the deployed computational algorithm within the user-specified time interval, thereby leaving remaining resources available for other tasks and enhancing processing performance.

It will be appreciated that the embodiments described above and illustrated in the drawings represent only a few of the many ways of implementing embodiments for time frame bounded execution of computational algorithms.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, analysis module, resource module, virtual machines, containers, compute engines, etc.). These systems may include any types of monitors and input devices (e.g., keyboard, mouse, voice recognition, etc.) to enter and/or view information.

It is to be understood that the software (e.g., analysis module, resource module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., analysis module, resource module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other storage units (e.g., files, databases, data structures, data or other repositories, etc.) to store information (e.g., information for the templates, node locations/paths, counts, node information, etc.). The storage units may be implemented by any number of any conventional or other databases, data stores or storage structures (e.g., files, databases, data structures, data or other repositories, etc.) to store information (e.g., information for the templates, node locations/paths, counts, node information, etc.). The storage units may be included within or coupled to the distributed computing cluster and/or client systems. The storage units may be remote from or local to the computer or other processing systems, and may store any desired data (e.g., information for the templates, node locations/paths, counts, node information, etc.).

The present invention embodiments may employ any number of any type of user interface (e.g., Graphical User Interface (GUI), command-line, prompt, etc.) for obtaining or providing information (e.g., requests, computational algorithms, time intervals, results, report, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results, etc.).

The present invention embodiments are not limited to the specific tasks or algorithms described above, but may be utilized for adjusting computation resources for any desired tasks in any distributed or other computing environment (e.g., multi-processor, etc.). The distributed object storage system may store any desired objects, and may include any quantity of any types of nodes (e.g., load balancer, proxy, storage, etc.) arranged in any desired fashion. The nodes may include any quantity of any types of virtual machines and/or containers with adjustable configurations to provide suitable resources for executing the deployed computational algorithms (e.g., within a specified time interval).

The categories may include any quantity of any desired categories or types for the objects and computational algorithms. The categories may include any desired names. The computational algorithms may perform any desired computational or other tasks to process the data in any fashion, and may be deployed in any desired fashion (e.g., command, from an application, etc.). The request to deploy the computational algorithm may include any desired parameters or information (e.g., synchronous, asynchronous, or other mode of operation, indication of the computational algorithm (e.g., location, file, module, etc.), etc.). The computational algorithm may be in any desired form (e.g., software module, code or instructions implementing the computational algorithm, etc.).

The templates may be represented in any suitable form or data structure, and contain any desired information (e.g., object types or categories, node configurations (e.g., memory, CPU, cache, etc.), computational algorithm types or categories, resource execution times and other specifications, etc.).

The node locations for an object may be stored in any fashion, and indicated in any desired manner (e.g., address, path, pointer, etc.). The counters may be implemented by any suitable counters, and adjusted in any fashion (e.g., incremented by any value, decremented by any value, etc.) to indicate a quantity of objects.

The execution time may be estimated for any quantity of objects based on any desired information (e.g., individual or combinations of operations within a deployed computational algorithm, measured execution times for the same or similar computational algorithms, statistical determinations, measurements based on simulations, etc.). The computation resources may be adjusted in any fashion based on any desired information (e.g., proportional adjustment of node configuration resources (e.g., CPU cores and/or processing speed, memory, cache, etc.), statistical determinations, determinations from simulations, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing resources of a distributed system including a plurality of nodes to perform computational tasks within a specified time interval comprising:

classifying a received object into a type of computational processing among a plurality of types and maintaining a quantity of objects classified in each type of computational processing, wherein the object includes a data object and the classified type of computational processing requires the data object for processing, and wherein classifying a received object further comprises:
determining a type of the received object based at least on content of the received object; and
applying the determined type of the received object to a category template of pre-defined computational algorithm categories to determine the type of computational processing;
estimating an execution time for processing a single object for the type of computational processing based on a corresponding computation resource template;
determining a total execution time for the quantity of objects classified in the type of computational processing based on the estimated execution time; and
in response to the total execution time exceeding a user-specified time interval:
determining an amount of resources of the distributed system required to process the quantity of objects classified in the type of computational processing within the user-specified time interval;
identifying a portion of nodes of the distributed system containing objects classified in the type of computational processing;
reconfiguring the identified nodes with the determined amount of resources to process the quantity of objects classified in the type of computational processing; and
invoking the identified nodes of the distributed system with the objects classified in the type of computational processing to use the determined amount of resources and process the quantity of objects classified in the type of computational processing within the user-specified time interval.

2. The method of claim 1, wherein the distributed system includes one or more proxy nodes for handling requests for data in storage units and one or more storage nodes for interacting with the storage units.

3. The method of claim 1, further comprising:
storing an indication of a node corresponding to the type of computational processing for the received object; and
adjusting the quantity of objects for the type of computational processing based on the classification.

4. The method of claim 1, wherein invoking the identified nodes of the distributed system includes:
invoking a container on the identified nodes of the distributed system with objects classified in the type of computational processing.

5. The method of claim 1, wherein the received object facilitates deployed computational processing.

6. The method of claim 5, wherein estimating an execution time includes:
parsing the deployed computational processing into a sequence of actions;
identifying operations to perform the sequence of actions; and
retrieving information from the corresponding computation resource template for the identified operations.

* * * * *